United States Patent [19]
Kim

[11] Patent Number: 6,038,003
[45] Date of Patent: Mar. 14, 2000

[54] LIQUID CRYSTAL DISPLAY AND METHOD OF MANUFACTURING THE SAME

[75] Inventor: Jeom Jae Kim, Seoul, Rep. of Korea

[73] Assignee: LG. Philips LCD Co., Ltd., Rep. of Korea

[21] Appl. No.: 09/093,974

[22] Filed: Jun. 9, 1998

[30] Foreign Application Priority Data

Jun. 11, 1997 [KR] Rep. of Korea .................. 97-24063

[51] Int. Cl.⁷ ..................... G02F 1/136; G02F 1/1333; G02F 1/1345; H01R 13/62; H01R 39/00
[52] U.S. Cl. ..................... 349/43; 349/152; 349/122; 438/158; 438/30
[58] Field of Search ................... 349/122, 139, 349/140, 149, 152, 138, 42, 43; 438/158, 30

[56] References Cited

U.S. PATENT DOCUMENTS

| | | | |
|---|---|---|---|
| 5,731,856 | 3/1998 | Kim et al. | 349/43 |
| 5,847,781 | 12/1998 | Ono et al. | 349/43 |
| 5,926,235 | 7/1999 | Han et al. | 349/43 |

*Primary Examiner*—William L. Sikes
*Assistant Examiner*—Joanne Kim
*Attorney, Agent, or Firm*—Long, Aldridge & Norman

[57] ABSTRACT

A liquid crystal display includes a gate bus line, a gate electrode extending from the gate bus line, and a gate pad placed at an end portion of the gate bus line with a first conductive material formed on a substrate. A first insulating material, an intrinsic semiconductor material, a doped semiconductor material and a second conductive material are sequentially deposited on the gate bus line, the gate electrode, and the gate pad. The second conductive material is patterned to form a source bus line, a source electrode extending from the source bus line, a drain electrode, and a source pad at an end portion of the source bus line. A semiconductor layer, a gate insulating layer, and a gate protecting layer covering a first portion of the gate pad are formed by simultaneously patterning the intrinsic semiconductor material and the first insulating material. A passivation layer is formed by depositing a second insulating material over the substrate, the source bus line, the source electrode, the drain electrode, and the source pad, and patterning the passivation layer to expose a second portion of the gate pad and the gate pad protecting layer.

22 Claims, 9 Drawing Sheets

LIQUID CRYSTAL DISPLAY AND METHOD OF MANUFACTURING THE SAME

This application claims the benefit of Korean Application No. 97-24063, filed on Jun. 11, 1997, which is hereby incorporated by reference.

BACKGROUND OF THE INVENTION

1. Field of the Invention

The present invention relates to a liquid crystal display (LCD), such an active matrix liquid crystal display (AMLCD), and a method of manufacturing the same. More particularly, the present invention relates to an LCD and a method of manufacturing the same that prevents defects formed at end portions of lines, such as pads.

2. Discussion of the Related Art

Among display devices for showing visual images on a screen, cathode ray tube (CRT) display devices, which have been used in general, are nowadays being replaced by thin film type flat panel displays which are thin, light and easily usable at any place. Active research activities have been focusing especially on the development of liquid crystal displays because of their high resolution and fast response time suitable for display of motion picture images.

A liquid crystal display works by using polarization and optical anisotrophy of a liquid crystal The orientation of liquid crystal molecules is controlled by applying an electromagnetic field to the molecules which are arrayed in one direction and polarized due to their long and thin shape. When controlling the orientation of liquid crystal molecules, transmission of light through the liquid crystal is achieved due to the anisotrophy of the liquid crystal. This principle is applied to a display device. Because active matrix liquid crystal displays (AMLCDs), which have TFTs arranged in a matrix pattern and pixel electrodes connected to the TFTs, provide high quality images and natural colors, they are actively studied. The structure of a conventional liquid crystal display will now be described.

The conventional liquid crystal display comprises two panels, on which various elements are placed, and liquid crystal between the two panels. One panel of the LCD includes elements for reproducing colors, called a color filter panel. The color filter panel has color filters of red (R), green (G) and blue (B) which are sequentially arranged and correspond to pixels formed in a matrix pattern on a transparent substrate. Among these color filters, very thin black matrixes are formed in a lattice pattern. They prevent mixture of colors at the boundaries of the color filters. A common electrode covers the color filters, which functions as one electrode generating an electric field applied to the liquid crystal.

The other panel includes switching elements and bus lines which generate the electric field for driving the liquid crystal. It is called an active panel. The active panel has pixel electrodes which are formed on the transparent substrate. The pixel electrodes are opposite to the common electrode formed on the color filter panel, and functions as the other electrode generating the electric field applied to the liquid crystal. Signal bus lines run along the column direction of the array of the pixel electrodes, and data bus lines run along the row direction of the array of pixel electrodes. At a corner of the pixel electrode, a TFT is formed, which applies electromagnetic field to the pixel electrode. A gate electrode of the TFF is connected with the signal bus line (gate bus line), and a source electrode is connected with the data bus line (source bus line). A drain electrode of the TFT is connected to the pixel electrode. A gate pad and a source pad, which function as terminals receiving external signals, are formed at the end portions of the gate bus line and the source bus line, respectively.

When an external electric signal, which is applied to the gate pad, is sent to the gate electrode through the gate bus line, an electrical picture data, which is applied to the source pad, is sent to the source electrode through the source bus line and to the drain electrode. In the case that the electric signal is not applied to the gate electrode, the electrical picture data, which is applied to the source electrode over the gate electrode, is not sent to the drain electrode. Accordingly, it is decided whether the data signal is applied to the drain electrode by controlling the signal to the gate electrode. Therefore, application of the data signal to the pixel electrode, which is connected to the drain electrode, is artificially controlled. In other words, the TFT functions as a switch driving the pixel electrode.

These two panels are joined with a certain distance (called a "cell gap"), and the liquid crystal is injected therebetween. Finally, polarizing plates are attached to the outer surfaces of the two panels, and thereby the liquid crystal panel of the LCD is completed.

Figure 1:
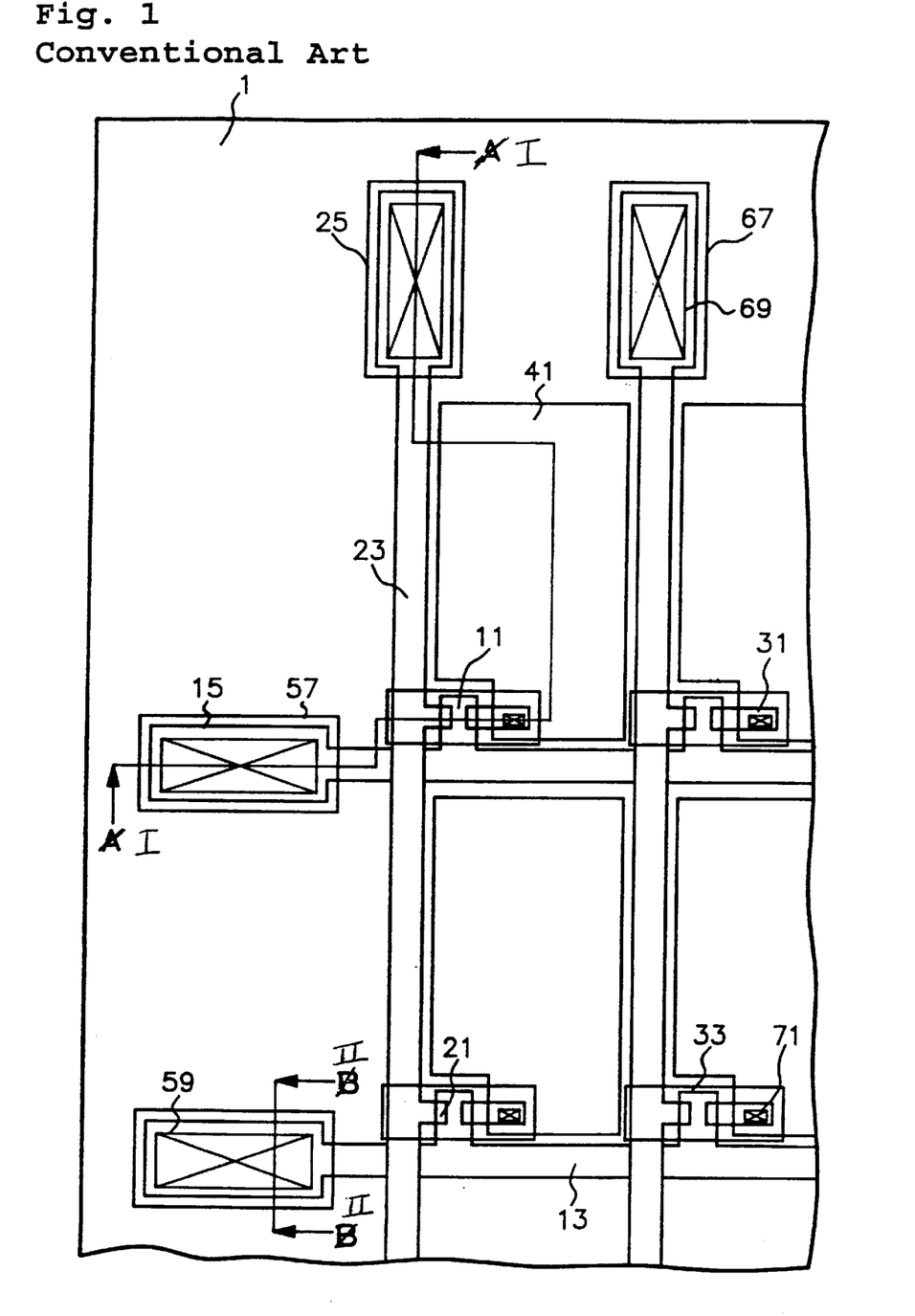
FIG. 1 is an enlarged plan view showing a conventional liquid crystal display.

There are various manufacturing methods and structures of the liquid crystal displays. Active research has been carried out in order to improve efficiency of the LCD and to reduce the manufacturing costs. Manufacturing method and structure of the LCD, which are related to the present invention, will now be described with reference to FIG. 1, which is a plan view showing the conventional LCD, and to FIG. 2, which is a cross-sectional view showing a conventional manufacturing process taken along line I—I of FIG. 1.

Figure 2A:
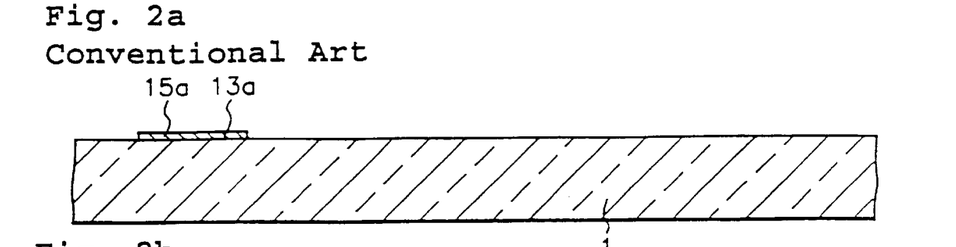
FIGS. 2a–2g are cross-sectional views showing a manufacturing process of the conventional liquid crystal display.

Metal including aluminum is deposited on a transparent glass substrate 1. A low resistive gate bus line 13a and a low resistive gate pad 15a are formed by patterning the metal with a first mask. The low resistive gate bus line 13a has the same shape as the gate bus line, which will be formed later. The low resistive gate pad 15a is placed at the end portion of the low resistive gate bus line 13a (FIG. 2a).

Figure 2B:
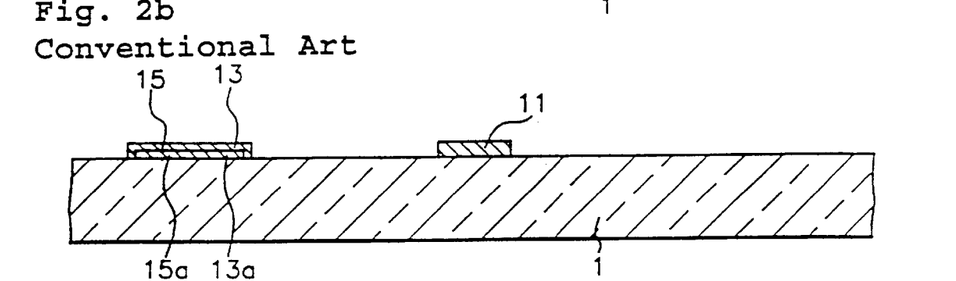

Metal including chromium, molybdenum, tantalum or antimony is deposited on the entire surface of the substrate. A gate electrode 11, a gate bus line 13 and a gate pad 15 are formed by patterning the metal with a second mask. The gate bus line 13 covers the low resistive gate bus line 13a. The gate bus line 13 covers either the entire surface of the low resistive gate bus line 13a or a portion of the low resistive gate bus line 13a. The gate electrode 11 branches out from the gate bus line 13 and is placed at a corner of the pixel. The gate pad 15 covers the low resistive gate pad 15a as the gate bus line 13 covers the low resistive gate bus line (FIG. 2b).

Figure 2C:
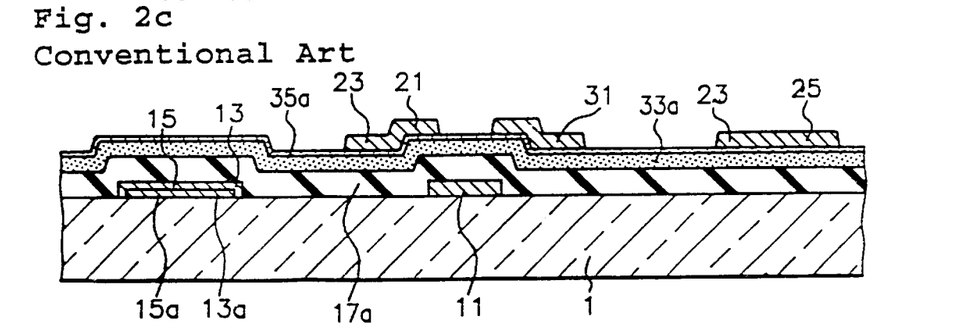

An inorganic insulating material 17a such as silicon oxide or silicon nitride, an intrinsic semiconductor material 33a such as an intrinsic amorphous silicon, a doped semiconductor material 35a such as a doped amorphous silicon, and a metal 21a including chromium are sequentially deposited on the entire surface of the substrate. A source electrode 21, a drain electrode 31, a source bus line 23, and a source pad 25 are formed by patterning the metal 21a with a third mask. The source electrode 21 is placed over one side of the gate electrode 11 with the intrinsic semiconductor material 33a and the doped semiconductor material 35a being sandwiched between the source electrode and the gate electrode. The drain electrode 31 is placed over the other side of the gate electrode 11. A plurality of source electrodes 23 in a row direction are connected with the source bus line 23. The source pad 25 is placed at the end portion of the source bus line 23 and is connected to an external image signal terminal (FIG. 2c).

Figure 2D:
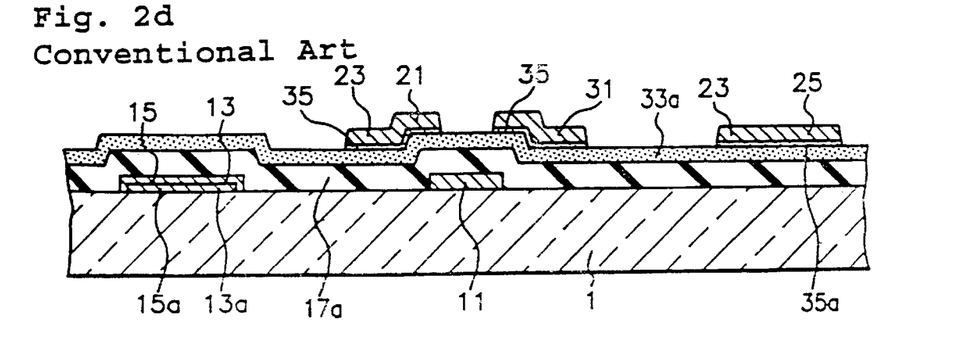

The doped semiconductor material 35a is dry-etched to form a doped semiconductor layer 35 by using the source electrode 21, the source bus line 23 and the drain electrode 31 as a mask. The doped semiconductor layer 35 is in ohmic contact with the source electrode 21, the source bus line 23 and the drain electrode 31 (FIG. 2d).

Figure 2E:
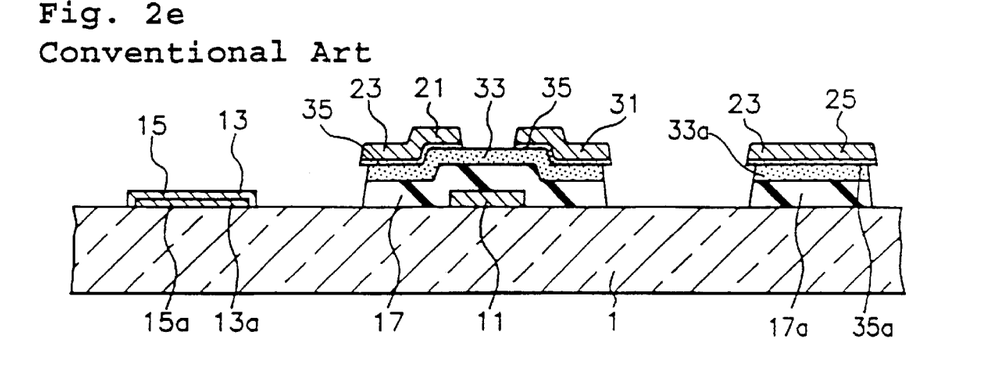

A semiconductor layer 33, which functions as a channel, is formed over the gate electrode 11 by patterning the inorganic insulating material 17a and the intrinsic semiconductor material 33a with a fourth mask. At this patterning step, the gate pad 15 is fully exposed. The doped semiconductor material 35a and the intrinsic semiconductor material 33a remain under the source pad 25 (FIG. 2e).

Figure 2F:
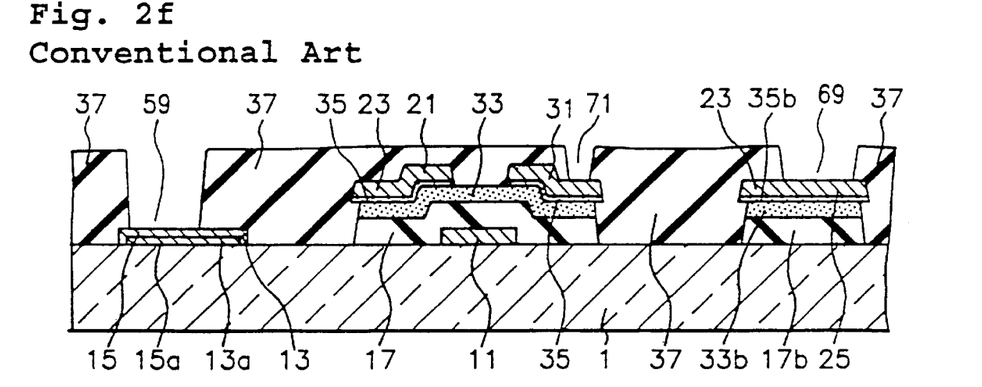

An organic passivation layer 37 is formed by coating an organic insulating material such as benzocyclobutene (BCB) on the resultant surface of the substrate. A drain contact hole 71, a gate pad contact hole 59 and a source pad contact hole 69 are formed by using a fifth mask. The drain contact hole 71 is formed by etching a portion of the organic passivation layer 37 covering the drain electrode 31, and a portion of the drain electrode 31 is exposed. The gate pad contact hole 59 is formed by etching a portion of the organic passivation layer 37 covering the gate pad 15, and a corresponding portion of the gate pad 15 is exposed. The source pad contact hole 69 is formed by etching another portion of the organic passivation layer 37 covering the source pad 25, and a corresponding portion of the source pad 25 is exposed (FIG. 2f).

Figure 2G:
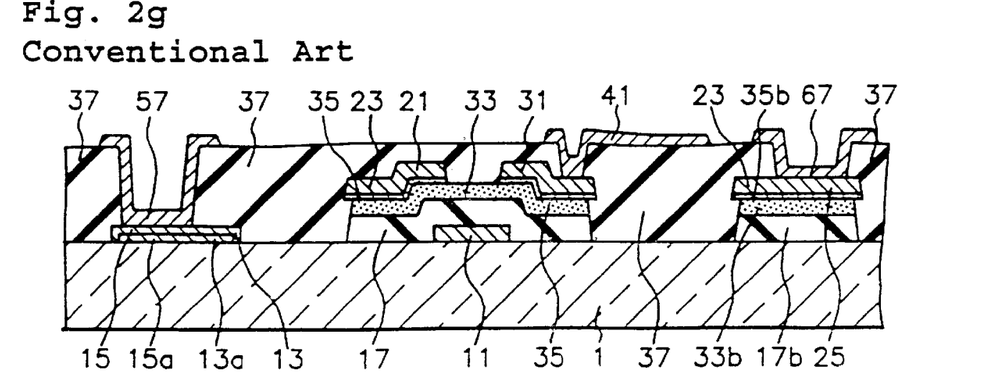

Indium Tin Oxide (ITO) is deposited on the passivation layer 37. A pixel electrode 41, a gate pad connector 57 and a source pad connector 67 are formed by patterning the ITO with a sixth mask. The pixel electrode 41 is connected to the drain electrode 31 through the drain contact hole 71. The gate pad connector 57 is connected to the gate pad 15 through the gate pad contact hole 59. The source pad connector 67 is connected to the source pad 25 through the source pad contact hole 69 (FIG. 2g).

When the passivation layer 37 is formed with an organic material on the stepped surface, the resultant surface becomes level, not stepped. Accordingly, the pixel electrode 41, which is formed on the organic passivation layer, is free from line-disconnection. Furthermore, because the organic material has a relatively low dielectric constant, parasitic capacitance is not formed between the pixel electrode 41 and the source bus line 23 even though the pixel electrode overlaps the source bus line 23. In other words, when the passivation layer 37 is made from organic materials, the pixel electrode 41 can be formed to be large, and therefore increasing the aperture ratio.

Figure 3A:
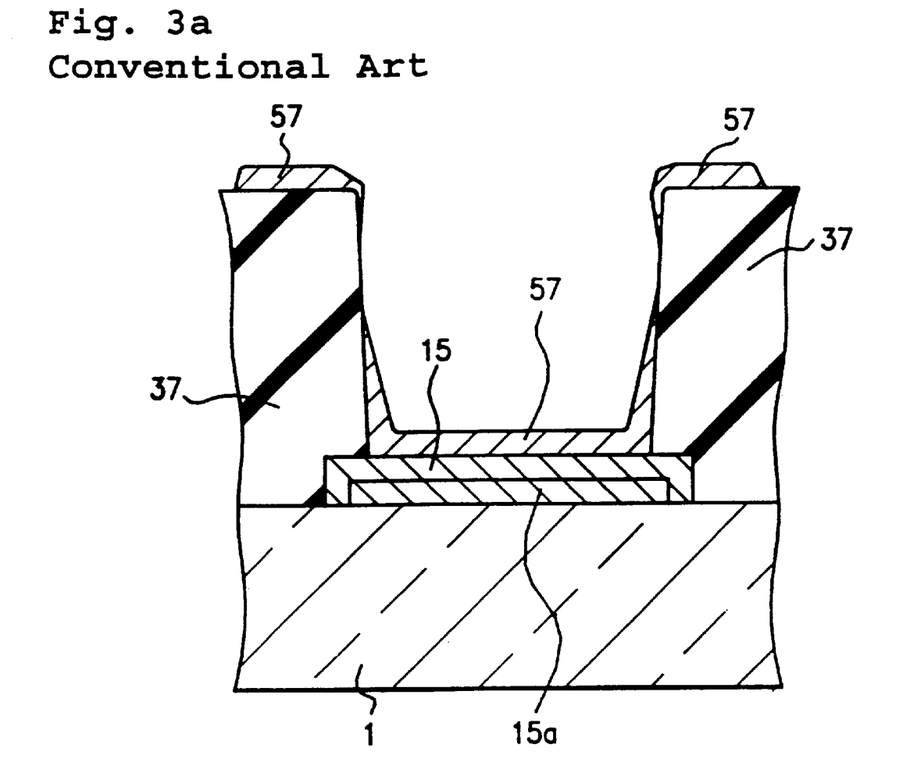
FIGS. 3a and 3b are cross-sectional views showing a gate pad of the conventional liquid crystal display.

As described above, six masking steps are needed for manufacturing the active panel having double layered gate bus line, and the passivation layer is formed with an organic material such as BCB in order to achieve a high aperture ratio. However, this manufacturing method results in a defect in the gate pad. For a better understanding, the defect in the gate pad will be described with reference to FIG. 3 which is taken along line II—II of FIG. 1. When the passivation layer is formed with an organic material the organic insulating layer is 1–2 μm thick. Accordingly, the contact hole on the gate pad is considerably deep. This causes the gate pad connector, which is connected to the gate pad through the gate contact hole, to be disconnected at around the mouth of the contact hole (FIG. 3a).

Figure 3B:
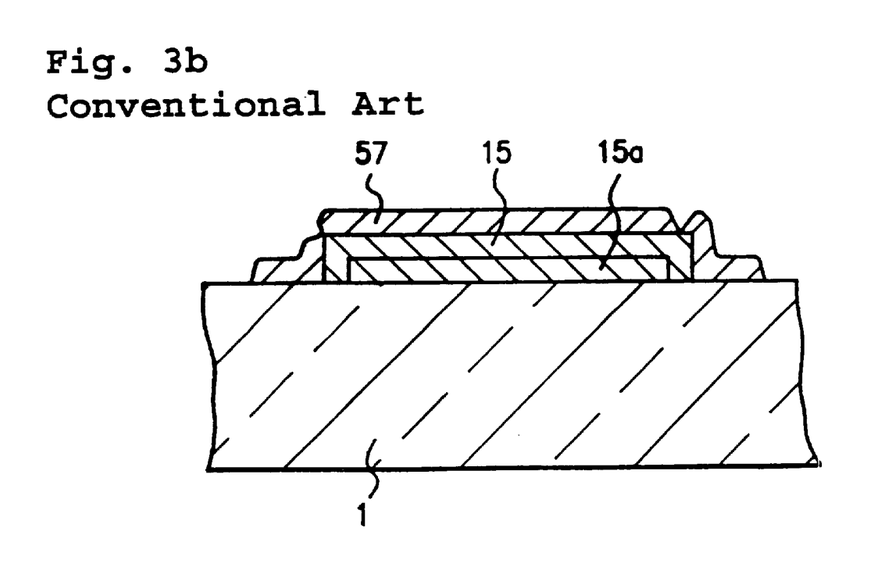

In order to obviate this defect, another method has been presented where the passivation layer is formed with an organic material. The entire surface of the gate pad is exposed when the passivation layer is patterned with a sixth mask. The gate pad connector fully covers the gate pad. However, a problem still occurs because the gate pad suffers from the etchant which penetrates through the stepped sides of the gate pad connector (FIG. 3b).

SUMMARY OF THE INVENTION

Accordingly, the present invention is directed to a liquid crystal display and a method for manufacturing the same that substantially obviates one or more of the problems due to limitations and disadvantages of the related art.

An object of the present invention is to prevent the formation of discontinuity in the gate pad connector which is connected to the gate pad through the gate pad contact hole formed in the passivation layer.

Another object of the present invention is to prevent the gate pad from being damaged by the etchant which penetrates through the sides of the gate pad connector, when the gate pad has no organic passivation layer thereon and the gate pad connector filly covers the gate pad.

Additional features and advantages of the invention will be set forth in the description which follows, and in part will be apparent from the description, or may be learned by practice of the invention The objectives and other advantages of the invention will be realized and attained by the structure particularly pointed out in the written description and claims hereof as well as the appended drawings.

To achieve these and other advantages and in accordance with the purpose of the present invention, as embodied and broadly described, a method of manufacturing a liquid crystal display comprises the steps of forming a gate bus line, a gate electrode extending from the gate bus line, and a gate pad placed at an end portion of the gate bus line, with a first conductive material on a substrate; sequentially depositing a first insulating material, an intrinsic semiconductor material, a doped semiconductor material and a second conductive material on the gate bus line, the gate electrode and the gate pad; patterning the second conductive material to form a source bus line, a source electrode extending from the source bus line, a drain electrode and a source pad at an end portion of the source bus line; forming a semiconductor layer, a gate insulating layer, and a gate protecting layer covering a first portion of the gate pad, by simultaneously patterning the intrinsic semiconductor material and the first insulating material; and forming a passivation layer by depositing a second insulating material over the substrate, the source bus line, the source electrode, the drain electrode, and the source pad, and patterning the passivation layer to expose a second portion of the gate pad and the gate pad protecting layer.

In another aspect of the present invention, a method of manufacturing a liquid crystal display comprises the steps of forming a gate bus line, a gate electrode extending from the gate bus line, and a gate pad at an end portion of the gate bus line, with a first conductive material on a substrate; forming a gate insulating layer, a semiconductor layer, a doped semiconductor layer and a gate protecting layer covering a first portion of the gate pad, by sequentially depositing and patterning a first insulating material, an intrinsic semiconductor material, and a doped semiconductor material on the gate bus line, the gate electrode, and the gate pad; forming a source electrode, a drain electrode, a source bus line, and a source pad with a second conductive material over the substrate including the doped semiconductor layer; and forming a passivation layer by depositing a second insulating material over the substrate including the source bus line, the source electrode, the drain electrode, and the source pad, and to expose a second passivation layer to expose a second portion of the gate pad and the gate pad protecting layer.

In another aspect of the present invention, a liquid crystal display comprises a substrate; a gate bus line including a first conductive material on the substrate; a gate electrode extending from the gate bus line; a gate pad at an end portion of the gate bus line; a gate insulating layer including a first insulating material covering the gate electrode and the gate bus line; a semiconductor layer including an intrinsic semiconductor material on a portion of the gate insulating layer over the gate electrode; a gate pad protecting layer including a portion of the first insulating material and the semiconductor material and covering a border portion of the gate pad; a source electrode including a second conductive material and in contact with one side of the semiconductor layer; a source bus line connected to the source electrode; a source pad at an end portion of the source bus line; and a passivation layer including a second insulating material and covering the substrate excluding the gate pad and the gate pad protecting layer.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE PREFERRED EMBODIMENTS

Referenced will now be made in detail to the preferred embodiments of the present invention, examples of which are illustrated in the accompanying drawings.

In the present invention, a portion of the passivation layer covering the gate pad is fully etched instead of forming a contact hole in the organic passivation layer covering the gate pad. In order to prevent penetration of the enchant to the gate pad, a protecting layer, which covers the border of the gate pad, is formed at the step of forming a gate insulating layer and a semiconductor layer. In order to make the manufacturing process simple, anodic oxidation of the gate electrode, the gate bus line, and the gate pad are not performed. Instead, the following method is performed.

A low resistive gate bus line and a low resistive gate pad are formed with a first conductive material on a substrate. A gate bus line and a gate pad, which respectively cover the low resistive gate bus line and the low resistive gate pad, are formed with a second conductive material. A gate electrode, which branches out from the gate bus line, is also formed with the second conductive material. A gate insulating layer and a semiconductor layer are formed with an insulating material and a semiconductor material, respectively. A protecting layer, including the insulating material and the semiconductor material, is formed to covering the border of the gate pad. A source electrode, a drain electrode, a source bus line, and a source pad are formed with a third conductive material. A gate pad interim electrode, which covers the gate pad and the gate pad protecting layer, may be formed at the step of forming the source electrode, etc. A passivation layer is formed with an organic material such as BCB. A drain contact hole is formed and the gate pad is fully exposed by patterning the passivation layer. A pixel electrode, which is connected to the drain electrode, and a gate pad connector, which is connected to the gate pad, are formed with a transparent conductive material. Preferred embodiments of the present invention will now be described in detail.

Preferred Embodiment 1

Figure 4:
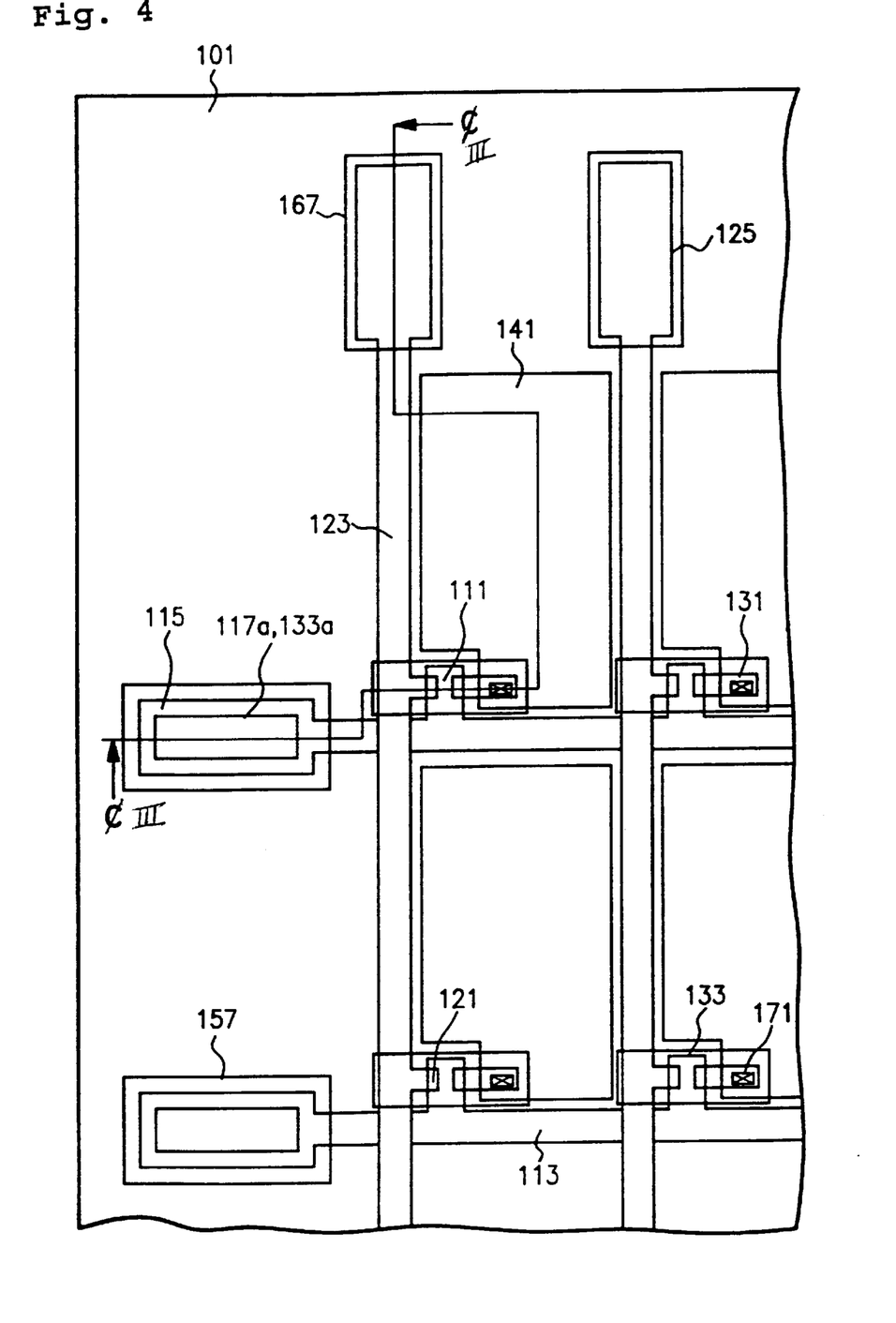
FIG. 4 is an enlarged view showing a liquid crystal display of the present invention.

The first preferred embodiment is described with reference to FIG. 4, which is an enlarged view showing an active panel of a liquid crystal display, and FIGS. 5a–5g, which are cross-sectional views taken along line III—III of FIG. 4, showing a manufacturing process.

Figure 5A:
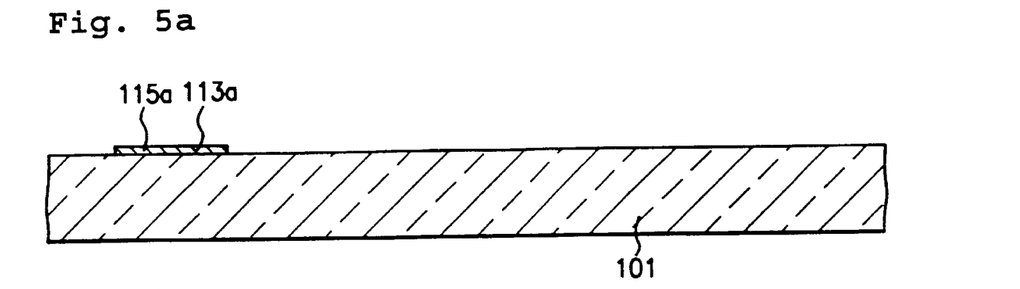
FIGS. 5a–5g are cross-sectional views showing a manufacturing process of the liquid crystal display according to one preferred embodiment of the present invention.

A metal preferably including aluminum is deposited on a transparent glass substrate 101. A low resistive gate bus line 113a and a low resistive gate pad 115a are formed preferably by patterning the aluminum layer with a photolithography method. The low resistive gate bus line 113a is placed where a gate bus line 113 will be formed. The low resistive gate pad 115a is placed at the end portion of the low resistive gate bus line 113a (FIG. 5a).

Figure 5B:
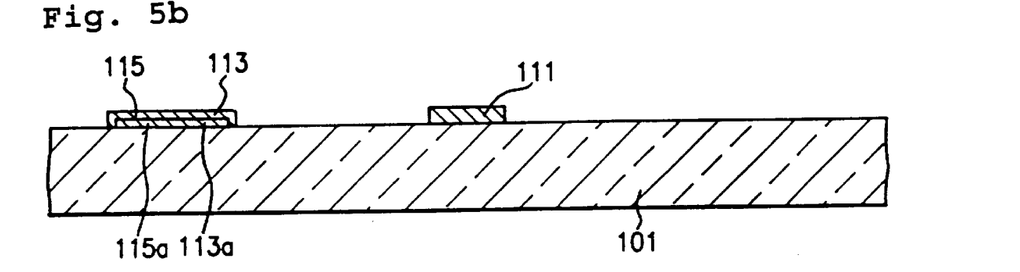

A metal such as chromium, molybdenum, tantalum or antimony is deposited on the substrate. A gate bus line 113, a gate electrode 111, and a gate pad 115 are formed preferably by patterning the metal with a second mask. The gate bus line 113 covers the low resistive gate bus line 113a (FIG. 5b). The gate bus line 113 covers either the entire low resistive gate bus line 113a as shown in the figure or a portion of the low resistive gate bus line 113a.

Figure 5C:
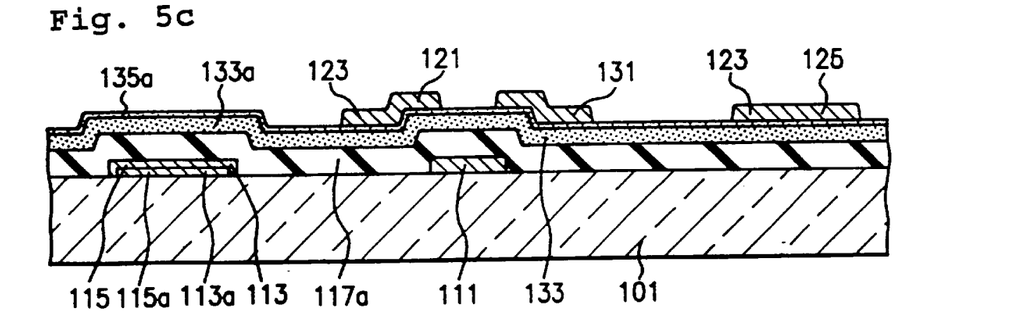

An inorganic insulating material 117a such as silicon oxide or silicon nitride is coated on the entire surface of the substrate. An intrinsic semiconductor material 133a such as an intrinsic amorphous silicon and a doped semiconductor material 135a such as doped amorphous silicon are sequentially formed. A metal including chromium is deposited to form a chromium layer. A source electrode 121, a drain electrode 131, a source bus line 123, and a source pad 125 are formed by patterning the chromium layer with a third mask. The source electrode 121 overlaps one side of the gate electrode 111. The intrinsic semiconductor material 133a and the doped semiconductor material 135a are sandwiched between the source electrode and the gate electrode. The drain electrode 131 is opposite to the source electrode 121 and overlaps the other side of the gate electrode 111. The source bus line 123 connects a plurality of source electrodes 121 in the same row direction. The source pad 125 is placed at the end portion of the source bus line 123 and is connected to an external image signal terminal (FIG. 5c).

Figure 5D:
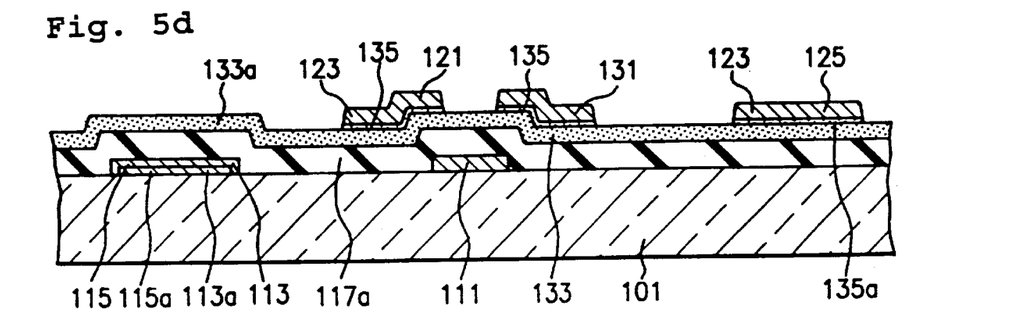

The doped semiconductor material 135a is preferably dry-etched using the source electrode 121, the source bus line 123, and the drain electrode 131 as a mask to form a doped semiconductor layer 135. The doped semiconductor layer 135 is in ohmic contact with the source electrode 121, the source bus line 123, and the drain electrode 131 (FIG. 5d).

Figure 5E:
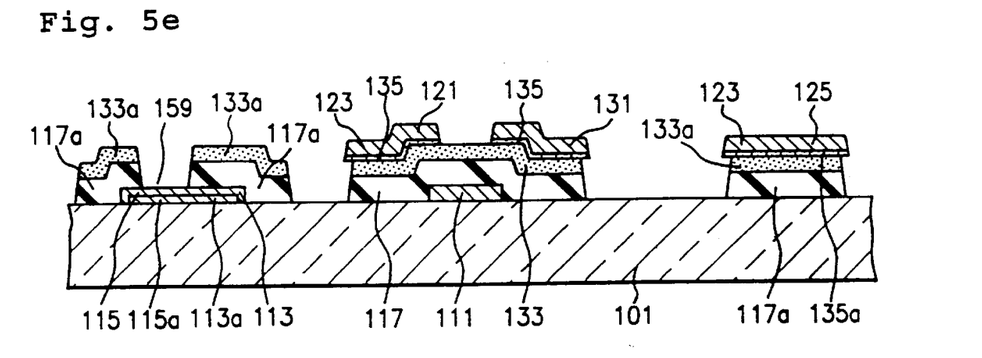

A semiconductor layer 133 and a gate insulating layer 117 are formed preferably by patterning the intrinsic semiconductor material 133a and the inorganic insulating material 117a with a fourth mask. At this patterning step, the border of the gate pad 115 is covered with the inorganic insulating material 117a and the intrinsic semiconductor material 133a, and a middle portion of the gate pad 115 is exposed by a contact hole 159 (FIG. 5e).

Figure 5F:
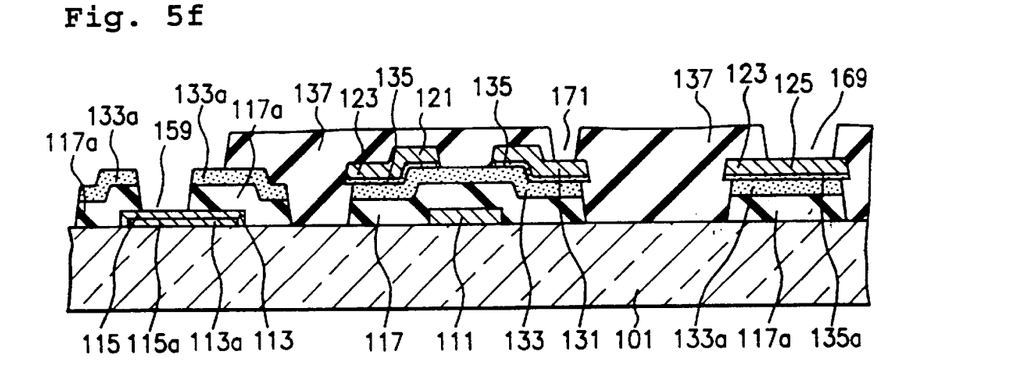

A passivation layer 137 is formed by coating an organic insulating material such as BCB on the entire surface of the substrate. A drain contact hole 171 is formed by patterning the passivation layer with a fifth mask. The drain contact hole 171 is formed by removing a portion of the passivation layer 137 covering the drain electrode 131. At this patterning step, other portions of the passivation layer 137, which cover the gate pad 115 and the source pad 125, are removed to expose the gate pad 115 and the source pad 125 (FIG. 5f). Here, the gate pad 115 and the source pad 125 may be fully exposed. Moreover, the portion of the passivation layer at the gate pad 115 may be removed completely, as shown in FIG. 5f.

Figure 5G:
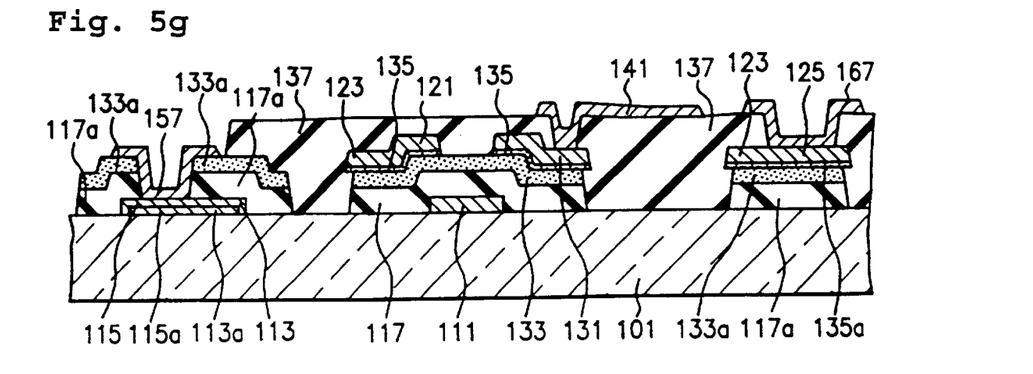

A transparent conductive material such as ITO is deposited on the passivation layer 137, and is patterned with a sixth mask to form a pixel electrode 141, a gate pad connector 157, and a source pad connector 167. The pixel electrode 141 is connected to the drain electrode 131 through the drain contact hole 171. The gate pad connector 157 covers the fully exposed gate pad 115. The source pad connector 167 covers the fully exposed source pad 125 (FIG. 5g).

In this preferred embodiment, the gate pad 115 is fully exposed instead of forming a contact hole. Therefore, line-disconnection of the gate pad connector, which may be unintentionally formed at walls of the contact hole, is no longer a threat. Furthermore, the border of the gate pad 115 is covered with the inorganic insulating material 117a, which forms the gate insulating layer 117, and with the intrinsic semiconductor material 133a, which forms the semiconductor layer 133. Therefore, although the etchant penetrates the gate pad connector 157 at the step of patterning the ITO, it does not affect the gate pad 115.

Preferred Embodiment 2

The second preferred embodiment of the present invention is described with reference to FIG. 4, and to FIGS. 6a–6f, which are cross-sectional views taken along line IV—IV of FIG. 4.

Figure 6A:
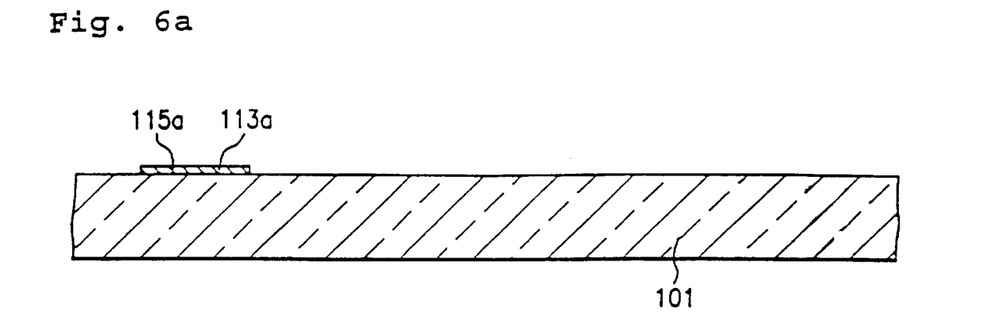
FIGS. 6a–6f are cross-sectional views showing a manufacturing process of the liquid crystal display according to another preferred embodiment of the present invention.

A metal preferably including aluminum is deposited on a transparent glass substrate 101. A low resistive gate bus line 113a and a low resistive gate pad 115a are formed preferably by patterning the aluminum layer with a photolithography method. The low resistive gate bus line 113a is placed where a gate bus line 113 will be formed. The low resistive gate pad 115a is placed at the end portion of the low resistive gate bus line 113a (FIG. 6a).

Figure 6B:
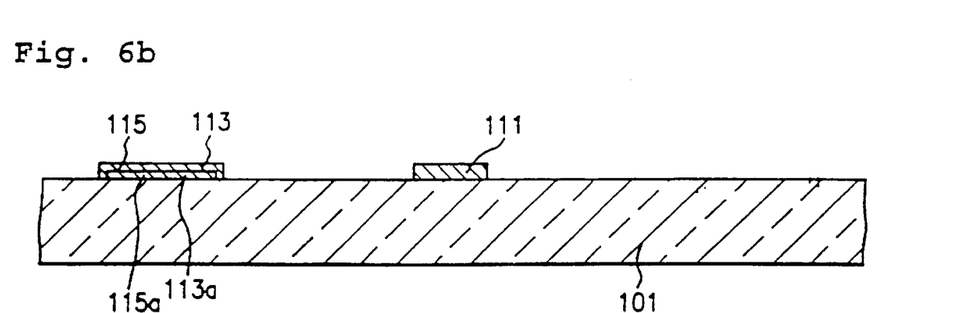

A metal such as chromium, molybdenum, tantalum or antimony is deposited on the substrate. A gate bus line 113, a gate electrode 111, and a gate pad 115 are formed by patterning the metal with a second mask. The gate bus line 113 covers the low resistive gate bus line 113a (FIG. 6b). The gate bus line 113 covers either the entire low resistive gate bus line 113a as shown in the figure or a portion of the low resistive gate bus line 113a.

Figure 6C:
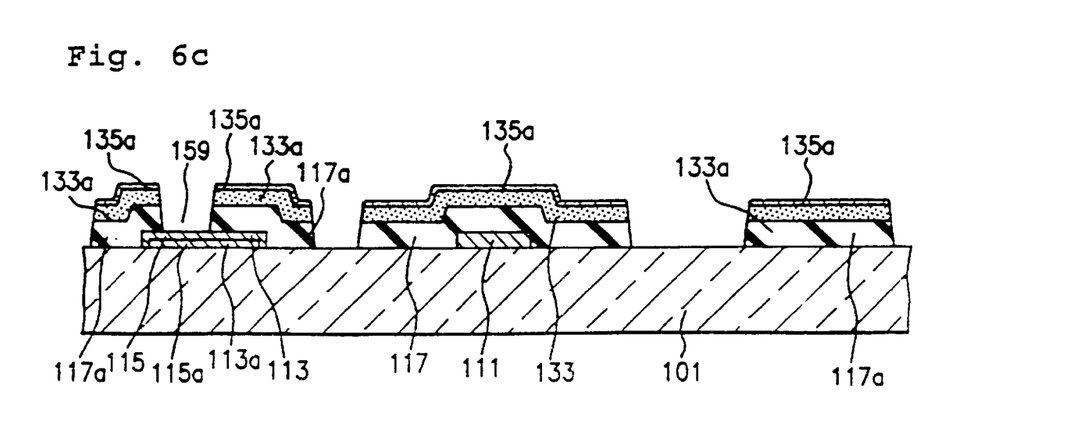

An inorganic insulating material 117a such as silicon oxide or silicon nitride is coated on the entire surface of the substrate. An intrinsic semiconductor material 133a such as intrinsic amorphous silicon and a doped semiconductor material 135a such as doped amorphous silicon are sequentially formed. A doped semiconductor layer 135, a semiconductor layer 133, and a gate insulating layer 117 are formed by simultaneously patterning the doped semiconductor material 135a, the intrinsic semiconductor material 133a, and the inorganic insulating material 117a with a third mask. At this patterning step, the border of the gate pad 115 is covered with the inorganic insulating material 117a and the intrinsic semiconductor material 133a, and a middle portion of the gate pad 115 is exposed (FIG. 6c).

Figure 6D:
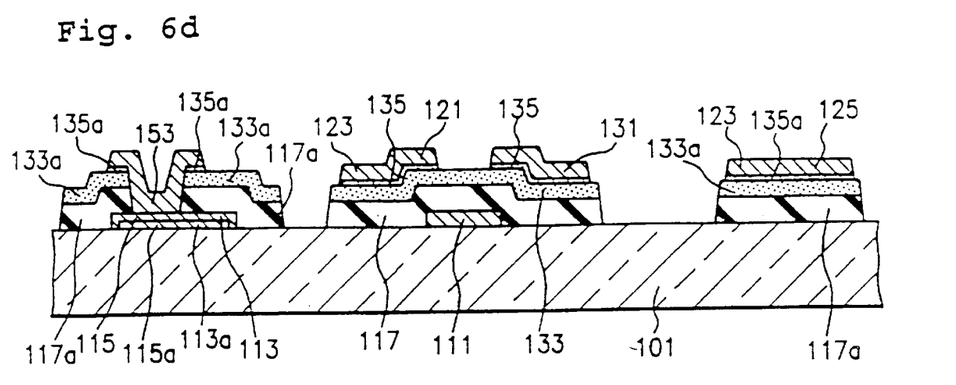

A metal preferably including chromium is deposited and patterned with a fourth mask to form a source electrode 121, a drain electrode 131, a source bus line 123, a source pad 125, and a gate pad interim electrode 153. The source electrode 121 overlaps one side of the gate electrode 111, with the semiconductor layer 133 and the doped semiconductor layer 135 being sandwiched between the source electrode and the gate electrode. The drain electrode 131 overlaps the other side of the gate electrode 111. The source bus line 123 connects a plurality of source electrodes 121 in the same row direction. The source pad 125 is placed at the end portion of the source bus line 123 and is connected to an external image signal terminal.

The gate pad interim electrode 153 is connected to the gate pad 115. The doped semiconductor layer 135 is preferably dry-etched using the source electrode 121, the source bus line 123, the drain electrode 131, and the gate pad interim electrode 153 as masks, and the doped semiconductor layer 135 preferably remains only under the source electrode 121, the source bus line 123, the drain electrode 131, and the gate pad interim electrode 153. The doped semiconductor layer 135 is in ohmic contact with the source electrode 121, the source bus line 123, and the drain electrode 131. Accordingly, the gate pad 115 is protected from the etchant by the inorganic insulating material 117a, the intrinsic semiconductor material 133a, and the gate pad interim electrode 153 (FIG. 6d).

Figure 6E:
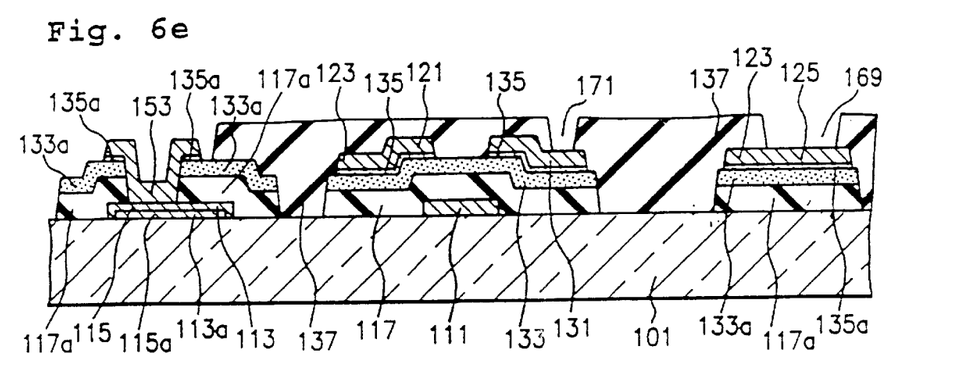

A passivation layer 137 is formed by coating an organic insulating material such as BCB on the entire surface of the substrate. A drain contact hole 171 is formed by patterning the passivation layer with a fifth mask. The drain contact hole 171 is formed by removing a portion of the passivation layer 137 covering the drain electrode 131. At this patterning step, other portions of the passivation layer 137, which cover the gate pad interim electrode 153 and the source pad 125, are removed so that the gate pad interim electrode 153, which covers the gate pad 115, the inorganic insulating material 117a, the intrinsic semiconductor material 133a, and the source pad 125 are fully exposed (FIG. 6e).

Figure 6F:
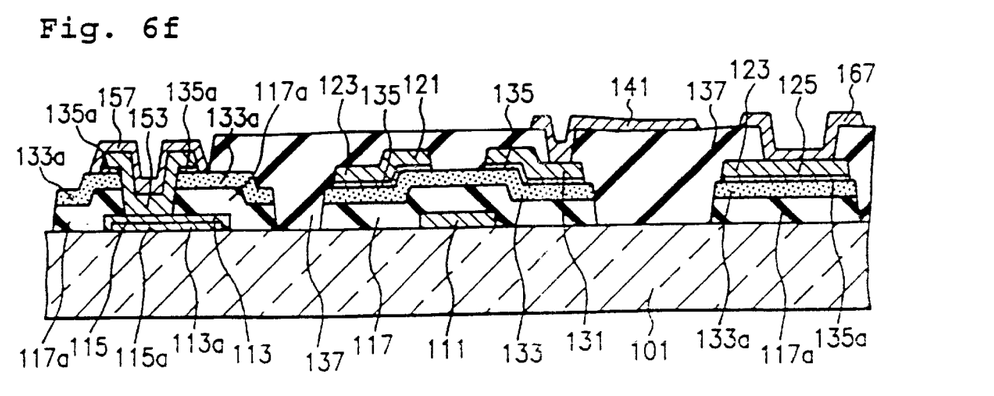

A transparent conductive material such as ITO is deposited on the passivation layer 137, and is patterned with a sixth mask to form a pixel electrode 141, a gate pad connector 157, and a source pad connector 167. The pixel electrode 141 is connected to the drain electrode 131 through the drain contact hole 171. The gate pad connector 157 covers the fully exposed gate pad 115. The source pad connector 167 covers the fully exposed source pad 125 (FIG. 6f).

In this preferred embodiment, the gate pad 115 is fully exposed instead of forming a contact hole. Therefore, line-disconnection of the gate pad connector, which is unintentionally formed at walls of the contact hole, is no longer a threat. Furthermore, the border of the gate pad 115 is covered with the inorganic insulating material 117a, which forms the gate insulating layer 117, and with the intrinsic semiconductor material 133a, which forms the semiconductor layer 133. The surface of the gate pad 115 is covered with the metal including chromium which forms the source electrode 121. Therefore, although the etchant penetrates the gate pad connector 157 at the step of patterning the ITO, it does not affect the gate pad 115.

The present invention relates to a method of preventing defects of the gate pad when manufacturing the LCD having a passivation layer made of an organic material such as BCB, and to the structure of the LCD manufactured by such a method. In the present invention, a portion of the organic passivation layer, which covers the gate pad, is removed so that the gate pad is fully exposed, and the gate pad connector, which covers the gate pad, is formed with ITO. Accordingly, the line-disconnection of the gate pad connector, which occurs at walls of the contact hole in the conventional LCD due to deposition defects or due to step coverage defects, does not occur. Furthermore, the insulating material and the semiconductor material are formed to cover the border of the gate pad when forming the gate insulating layer and the semiconductor layer. Accordingly, the gate pad does not suffer from the etchant when patterning the ITO in order to form the gate pad connector. Consequently, the manufacturing yield and quality of the product are improved.

Moreover, the gate pad interim electrode is formed with a metal that forms the source electrode on the gate pad, the insulating material, and the semiconductor material. The gate pad interim electrode effectively protects the gate pad and lowers the contact resistance of the gate pad so that a signal voltage, which is sent to the gate pad, is stabilized.

It will be apparent to those skilled in the art that various modifications and variation can be made in the liquid crystal display and method of manufacturing the same of the present invention without departing from the spirit or scope of the invention. Thus, it is intended that the present invention cover the modifications and variations of this invention provided they come within the scope of the appended claims and their equivalents.

What is claimed is:

1. A method of manufacturing a liquid crystal display comprising the steps of:

forming a gate bus line, a gate electrode extending from the gate bus line, and a gate pad placed at an end portion of the gate bus line, with a first conductive material on a substrate;

sequentially depositing a first insulating material, an intrinsic semiconductor material, a doped semiconductor material and a second conductive material on the gate bus line, the gate electrode and the gate pad;

patterning the second conductive material to form a source bus line, a source electrode extending from the source bus line, a drain electrode, and a source pad at an end portion of the source bus line;

forming a semiconductor layer, a gate insulating layer, and a gate pad protecting layer covering a first portion of the gate pad, by simultaneously patterning the intrinsic semiconductor material and the first insulating material, the gate pad protecting layer including a portion of the first insulating material and the semiconductor material; and forming a passivation layer by depositing a second insulating material over the substrate, the source bus line, the source electrode, the drain electrode, and the source pad, and patterning the passivation layer to expose a second portion of the gate pad and the gate pad protecting layer.

2. The method of manufacturing a liquid crystal display according to claim 1, the method further comprising the steps of:

forming a doped semiconductor layer by etching the doped semiconductor material using the source bus line, the source electrode, the drain electrode and the source pad as a mask;

forming a drain contact hole by patterning the passivation layer;

forming a pixel electrode electrically connected to the drain electrode through the drain contact hole;

a gate pad connector connected to the gate pad; and a source pad connector connected to the source pad.

3. The method of manufacturing a liquid crystal display according to claim 2, wherein the pixel electrode, the gate pad connector, and the source pad connector are formed simultaneously using a transparent conductive material.

4. The method of manufacturing a liquid crystal display according to claim 3, wherein the transparent conductive material includes indium tin oxide (ITO).

5. The method of manufacturing a liquid crystal display according to claim 1, the method further comprising the step of forming a low resistive gate bus line and a low resistive gate pad at an end portion of the low resistive gate bus line with a first metal before forming the gate bus line, the gate electrode, and the gate pad, wherein the gate bus line and the gate pad are formed with a second metal to cover the low resistive gate bus line and the low resistive gate pad, respectively.

6. The method of manufacturing a liquid crystal display according to claim 5, wherein the first metal includes aluminum.

7. The method of manufacturing a liquid crystal display according to claim 5, wherein the second metal includes one of chromium, molybdenum, tantalum, and antimony.

8. The method of manufacturing a liquid crystal display according to claim 1, wherein the first insulating material includes an inorganic material.

9. The method of manufacturing a liquid crystal display according to claim 8, wherein the inorganic material includes one of silicon oxide and silicon nitride.

10. The method of manufacturing a liquid crystal display according to claim 1, wherein the second insulating material includes an organic material.

11. A method of manufacturing a liquid crystal display according to claim 10, wherein the organic material includes benzocyclobutene (BCB).

12. A liquid crystal display comprising:

a substrate;

a gate bus line including a first conductive material on the substrate;

a gate electrode extending from the gate bus line;

a gate pad at an end portion of the gate bus line;

a gate insulating layer including a first insulating material covering the gate electrode and the gate bus line;

a semiconductor layer including an intrinsic semiconductor material on a portion of the gate insulating layer over the gate electrode;

a gate pad protecting layers including a portion of the first insulating material and the semiconductor materials covering a border portion of the gate pad;

a source electrode including a second conductive material and in contact with one side of the semiconductor layer;

a source bus line connected to the source electrode;

a source pad at an end portion of the source bus line; and a passivation layer including a second insulating material and covering the substrate excluding the gate pad and the gate pad protecting layer.

13. The liquid crystal display according to claim 12, further comprising:

a drain contact hole in the passivation layer corresponding to the drain electrode;

a pixel electrode including a transparent conductive material connected to the drain electrode through the drain contact hole;

a gate pad connector including the transparent conductive material covering the gate pad; and a source pad connector including the transparent conductive material covering the source pad.

14. The liquid crystal display according to claim 12, further comprising a gate pad interim electrode including the second conductive material and covering the gate pad and the gate pad protecting layer.

15. The liquid crystal display according to claim 14, further comprising:

a drain contact hole in the passivation layer corresponding to the drain electrode;

a pixel electrode including a transparent conductive material connected to the drain electrode through the drain contact hole;

a gate pad connector including the transparent conductive material covering the gate pad interim electrode; and a source pad connector including the transparent conductive material covering the source pad.

16. The liquid crystal display according to claim 12, wherein the first conductive material includes a first metal layer and a second metal layer.

17. The liquid crystal display according to claim 16, wherein the first metal layer includes aluminum.

18. The liquid crystal display according to claim 16, wherein the second metal layer includes one of chromium, molybdenum, tantalum, and antimony.

19. A liquid crystal display according to claim 12, wherein the second conductive material includes chromium.

20. The liquid crystal display according to claim 12, wherein the first insulating material includes one of silicon oxide and silicon nitride.

21. The liquid crystal display according to claim 12, wherein the second insulating material includes an organic material.

22. The liquid crystal display according to claim 21, wherein the organic material includes benzocyclobutene (BCB).

* * * * *